United States Patent
Tanemura et al.

(10) Patent No.: US 9,715,192 B2
(45) Date of Patent: Jul. 25, 2017

(54) SEMICONDUCTIVE ROLLER, METHOD FOR MANUFACTURING THE SAME AND IMAGE FORMING APPARATUS

(71) Applicant: FUJI XEROX CO., LTD., Tokyo (JP)

(72) Inventors: Daisuke Tanemura, Kanagawa (JP); Toru Ogawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 272 days.

(21) Appl. No.: 13/860,881

(22) Filed: Apr. 11, 2013

(65) Prior Publication Data

US 2014/0113782 A1 Apr. 24, 2014

(30) Foreign Application Priority Data

Oct. 24, 2012 (JP) .................... 2012-234786

(51) Int. Cl.
*G03G 15/16* (2006.01)
*F16C 13/00* (2006.01)

(52) U.S. Cl.
CPC ......... *G03G 15/16* (2013.01); *G03G 15/1685* (2013.01); *F16C 13/00* (2013.01); *Y10T 29/49544* (2015.01); *Y10T 29/49563* (2015.01)

(58) Field of Classification Search
CPC .. G03G 15/16; G03G 15/163; G03G 15/1685; G03G 15/0136; F16C 13/00;
(Continued)

(56) References Cited

U.S. PATENT DOCUMENTS 5,599,743 A * 2/1997 Nakagawa ........ H01L 21/32136
257/E21.311
5,786,091 A * 7/1998 Kurokawa ......... G03G 15/0233
361/221
(Continued)

FOREIGN PATENT DOCUMENTS

CN 102147584 A 8/2011
JP 6-271703 9/1994
(Continued)

OTHER PUBLICATIONS

English Machine Translation of JP 2003345089 (A), Mar. 12, 2003.*
(Continued)

*Primary Examiner* — Sarang Afzali
(74) *Attorney, Agent, or Firm* — Oliff PLC

(57) ABSTRACT

A semiconductive roller and a method of making the same, wherein the roller includes a conductive support and a semiconductive elastic layer disposed on a circumferential surface of the conductive support, the semiconductive elastic layer containing at least an epichlorohydrin rubber, an acrylonitrile-butadiene rubber and a conducting agent and having a foam structure, wherein, when the semiconductive roller is left to stand in pure water for 30 minutes, the chlorine ion content derived from the semiconductive elastic layer per unit area of the semiconductive elastic layer is approximately not more than 0.06 0.06 $\mu mol/cm^2$, wherein a mixing ratio of the epichlorohydrin rubber to the acrylonitrile-butadiene rubber ranges from 80/20 to 20/80 by mass and wherein no electricity has been run through the semiconductive roller prior to being immersed in the pure water.

6 Claims, 2 Drawing Sheets

(58) Field of Classification Search
CPC ......... Y10T 29/49544; Y10T 29/49549; Y10T 29/49551; Y10T 29/49563
See application file for complete search history.

(56) References Cited

U.S. PATENT DOCUMENTS

| | | | |
|---|---|---|---|
| 6,243,552 B1* | 6/2001 | Murata | G03G 15/0233 399/176 |
| 8,090,287 B2* | 1/2012 | Hoshio | 399/100 |
| 8,668,987 B2* | 3/2014 | Yamauchi et al. | 428/411.1 |
| 8,792,813 B2* | 7/2014 | Ichizawa | 399/313 |
| 2010/0247149 A1* | 9/2010 | Hoshio | G03G 15/0233 399/176 |
| 2011/0194880 A1* | 8/2011 | Ogawa et al. | 399/313 |
| 2012/0201568 A1* | 8/2012 | Kurachi | G03G 15/0818 399/111 |

FOREIGN PATENT DOCUMENTS

| | | |
|---|---|---|
| JP | A-2002-169382 | 6/2002 |
| JP | 2003-345089 A | 12/2003 |
| JP | 2004263059 A * | 9/2004 |
| JP | A-2005-181978 | 7/2005 |

OTHER PUBLICATIONS

"Room Temperature", New World Encyclopedia, Online Publication, Oct. 4, 2008, highlighted section http://www.newworldencyclopedia.org/entry/Room_temperature.*
Jan. 26, 2016 Notification of Reason for Refusal issued in Japanese Patent Application No. 2012-234786.
Sep. 2, 2016 Office Action issued in Chinese Patent Application No. 201310225167.3.

\* cited by examiner

SEMICONDUCTIVE ROLLER, METHOD FOR MANUFACTURING THE SAME AND IMAGE FORMING APPARATUS

CROSS-REFERENCE TO RELATED APPLICATIONS

This application is based on and claims priority under 35 USC 119 from Japanese Patent Application No. 2012-234786 filed Oct. 24, 2012.

BACKGROUND (i) Technical Field

The present invention relates to a semiconductive roller, a method for manufacturing the semiconductive roller, and an image forming apparatus.

(ii) Related Art

In electrophotographic image forming apparatuses such as copying machines and printers, a surface of an image carrier is charged, an electrostatic latent image is formed on the charged surface of the image carrier on the basis of image data, and then the electrostatic latent image is developed as a toner image. Then, the toner image on the image carrier is electrostatically transferred to a recording medium with a transfer device, and the toner image is subsequently fixed to the recording medium with, for example, a thermal fixing mechanism.

A conductive or semiconductive roller is employed in a charging device or a transfer device in some cases.

SUMMARY

According to an aspect of the invention, there is provided a semiconductive roller including a conductive support and a semiconductive elastic layer disposed on a circumferential surface of the conductive support, the semiconductive elastic layer containing at least an epichlorohydrin rubber and a conducting agent and having a foam structure, wherein, when the semiconductive roller is left to stand in water for 30 minutes, the chlorine ion content derived from the semiconductive elastic layer per unit area of the semiconductive elastic layer is approximately not more than 0.06 µmol/cm².

BRIEF DESCRIPTION OF THE DRAWINGS

Exemplary embodiment of the present invention will be described in detail based on the following figures, wherein.

DETAILED DESCRIPTION

Figure 1:
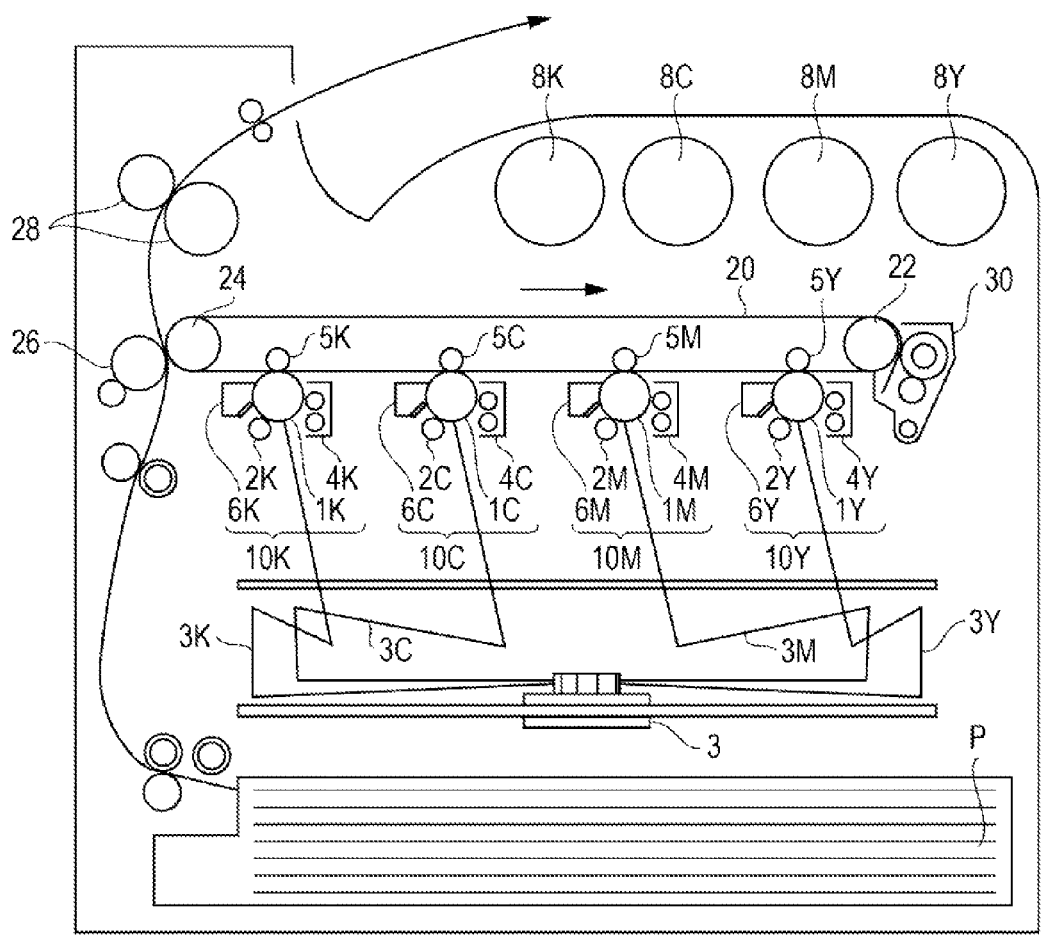
FIG. 1 schematically illustrates an example of the configuration of an image forming apparatus of an exemplary embodiment.

An exemplary embodiment will now be described in detail with reference to the drawings. In the drawings, the same or equivalent elements (components) are denoted by the same reference symbols, and repeated description thereof is omitted in some cases.

Semiconductive Roller

A semiconductive roller of the present exemplary embodiment includes a conductive support and a semiconductive elastic layer disposed on a circumferential surface of the conductive support, the semiconductive elastic layer at least containing an epichlorohydrin rubber and a conducting agent and having a foam structure, wherein, when the semiconductive roller is left to stand in water for 30 minutes, the chlorine ion content derived from the semiconductive elastic layer per unit area of the semiconductive elastic layer is not more than 0.06 µmol/cm² or approximately not more than 0.06 µmol/cm².

In the present exemplary embodiment, the term "conductive" refers to a volume resistivity of less than 7 log Ω·cm at 20° C. The term "semiconductive" refers to a volume resistivity of 7 log Ω·cm to 13 log Ω·cm at 20° C.

The inventors have obtained the following finding: in manufacturing of a semiconductive roller including a semiconductive elastic layer formed from a rubber composition which contains at least an epichlorohydrin rubber and a conducting agent, the semiconductive roller is immersed into water to preliminarily elute (remove) a residue after a polishing process, which leads to suppression of a decrease in resistance at high temperature and humidity [28° C. and 85% relative humidity (RH)] after passage of current at low temperature and humidity (10° C. and 15% RH). It is speculated that this phenomenon is caused by the following reason.

In general, a semiconductive roller is manufactured from a rubber composition containing an epichlorohydrin rubber or another material through processes of kneading the rubber composition, forming the kneaded rubber composition into a roller, heating the roller for vulcanization and foaming, and polishing the circumferential surface of the resulting roller. In the case where such a semiconductive roller manufactured from a rubber composition containing an epichlorohydrin rubber or another material is used as a transfer roller of an image forming apparatus, chlorine (Cl) is released from the side chain of the epichlorohydrin rubber which has been broken by electrical discharge at low temperature and humidity, and the released Cl is combined with an element derived from a compound used for vulcanization, such as zinc oxide, with the result that a compound such as $ZnCl_2$ is generated on the surface of the roller. Although resistance has not substantially decreased at this time, resistance subsequently decreases for the following reason: transferring the roller to a high temperature and humidity environment causes a compound such as $ZnCl_2$ to deliquesce (absorb moisture) with the result that the ion content increases, which leads to a decrease in resistance.

In the semiconductive roller of the present exemplary embodiment, the chlorine ion content on the surface of the semiconductive elastic layer is preliminarily reduced to a low level, which may suppress generation of a compound such as $ZnCl_2$ due to electrical discharge at low temperature and humidity. Hence, this configuration suppresses an increase in ion concentration due to the deliquescence (moisture absorption) of a compound such as $ZnCl_2$ even in the case where a roller is transferred to a high temperature and humidity environment, which leads to suppression of a decrease in resistance.

Conductive Support

The conductive support that serves as the core of the semiconductive roller of the present exemplary embodiment may be formed of, for instance, a metallic material such as steel use stainless (SUS) or free-cutting steel (SUM). The conductive support is provided so as to penetrate through the center of the cylindrical semiconductive elastic layer in the axial direction and functions as the rotation axis of the semiconductive roller.

Since an external power supply is connected to the conductive support to apply a bias, the conductive support also serves as a unit that applies a voltage to the semiconductive roller together with the external power supply.

Semiconductive Elastic Layer

The semiconductive elastic layer disposed on the circumferential surface of the conductive support contains at least an epichlorohydrin rubber and a conducting agent and has a foam structure. The semiconductive elastic layer may further contain an acrylonitrile-butadiene rubber (NBR) as a rubber component.

Epichlorohydrin Rubber

An epichlorohydrin rubber may be a binary copolymer of epichlorohydrin and allyl glycidyl ether (ECO) and may be, for example, a copolymer containing an epichlorohydrin unit and an allyl glycidyl ether unit represented by the below structural formulae, respectively. An example of commercially available products of epichlorohydrin rubber is Zechlone 1100 (manufactured by Zeon Corporation).

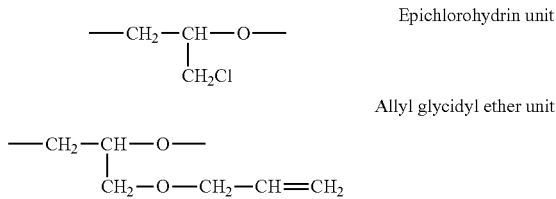

Acrylonitrile-butadiene Rubber

Examples of acrylonitrile-butadiene rubber (NBR) include Nipol DN211 (manufactured by ZEON CORPORATION, Mooney viscosity: 46), Nipol DN212 (manufactured by ZEON CORPORATION, Mooney viscosity: 78), Nipol DN215 (manufactured by ZEON CORPORATION, Mooney viscosity: 58), Nipol DN219 (manufactured by ZEON CORPORATION, Mooney viscosity: 27), and Nipol DN223 (manufactured by ZEON CORPORATION, Mooney viscosity: 35).

A binary copolymer of epichlorohydrin and allyl glycidyl ether and NBR are highly compatible with each other and are therefore mixed together while exhibiting high dispersibility. A rubber composition having a reduced variation in resistance may be thus produced.

The mixing ratio of the binary copolymer of epichlorohydrin and allyl glycidyl ether to NBR in the rubber composition used for forming the semiconductive elastic layer of the present exemplary embodiment (a binary copolymer of epichlorohydrin and allyl glycidyl ether/NBR) is preferably in the range of 80/20 to 20/80, and more preferably 60/40 to 40/60 in mass ratio.

If the mixing ratio of the binary copolymer of epichlorohydrin and allyl glycidyl ether to NBR is less than 20/80, a semiconductive roller to be produced has an excessively high initial electrical resistance in some cases.

If the mixing ratio of the binary copolymer of epichlorohydrin and allyl glycidyl ether to NBR is higher than 80/20, ionic conductivity may be enhanced with the result that electrical resistance becomes highly dependent on the environment in some cases. This causes an increase in the amount of the conducting agent (described below) having electron conductivity, which excessively increases the hardness of the semiconductive roller in some cases.

Conducting Agent

Conducting agents having electron conductivity, known conducting agents having ionic conductivity, or known conductive polymers may be used as the conductive agent. Among these conducting agents, conducting agents having electron conductivity may be employed, and examples thereof include carbon black; graphite; metals and alloys such as aluminum, nickel, and copper alloy; and metallic oxides such as tin oxide, zinc oxide, potassium titanate, and complex oxides (e.g., tin oxide-indium oxide and tin oxide-antimony oxide). Among these, carbon black may be employed.

The conducting agent content is adjusted to be in the range of 10 to 80 parts by mass, and preferably 30 to 70 parts by mass relative to 100 parts by mass of the total amount of the rubber components. At 10 to 80 parts by mass of the conducting agent content, a variation in the electrical resistance due to, for example, changes in environment and voltage may be effectively reduced in a semiconductive roller to be produced.

In addition to the epichlorohydrin rubber, acrylonitrile-butadiene rubber, and the conducting agent, the rubber composition used in the present exemplary embodiment contains a vulcanization component, such as a vulcanizing agent (crosslinking agent) or a vulcanizing accelerator, a foaming agent, and optionally a filler or another material.

The components contained in the semiconductive elastic layer of the present exemplary embodiment may exclude a conducting agent having ionic conductivity.

Foaming Agent

The semiconductive elastic layer of the present exemplary embodiment has a foam structure. In general, semiconductive elastic layers each having a foam structure have low hardness and therefore enables formation of a stable nip structure with an image carrier, a transfer belt, or another structure, but the electrical resistance of such semiconductive elastic layers tends to greatly depend on the environment. However, a foaming agent is added to the rubber composition of the present exemplary embodiment to form a semiconductive elastic layer having a foam structure, which enables production of a semiconductive elastic layer having a foam structure while exhibiting a small electrical resistance dependence on the environment.

Examples of the foaming agent include benzenesulfonyl hydrazide, azodicarbonamide, N,N'-dinitrosopentamethylenetetramine, and mixtures thereof.

Vulcanizing Agent

Examples of the vulcanizing agent (crosslinking agent) include, but are not limited to, thiourea, triazine, and sulfur.

Vulcanizing Accelerator

Examples of the vulcanizing accelerator include zinc oxides and magnesium oxides.

Filler

Examples of the filler include insulating fillers such as silica, talc, clay, and titanium oxides, and these insulating fillers may be used alone or in combination.

Properties

The semiconductive elastic layer included in the semiconductive roller of the present exemplary embodiment has the hardness, surface properties (surface roughness and friction coefficient), electrical properties (electrical resistance), or other properties thereof adjusted on the basis of the intended use of the semiconductive roller.

Adjusting the properties of the semiconductive elastic layer, such as electrical properties and surface properties, enables the semiconductive roller of the present exemplary embodiment to be also used in, for example, a transfer unit, a charging unit, and a static eliminator.

In terms of the surface properties of the semiconductive roller of the present exemplary embodiment, the surface hardness determined as Asker-C hardness in accordance with JIS K-7312 is adjusted preferably to be in the range of 10° to 70°, and more preferably 10° to 50° in the case where the semiconductive roller is used as a transfer unit or 20° to 70° in the case where the semiconductive roller is used as a charging unit.

In terms of the electrical properties of the semiconductive roller of the present exemplary embodiment, the volume resistance value of the semiconductive elastic layer is preferably adjusted to be in the range of 3 to 10 log Ω, and more preferably 6 to 10 log Ω in the case where the semiconductive roller is used as a transfer unit or 5 to 8 log Ω in the case where the semiconductive roller is used as a charging unit.

In this case, the volume resistance value (R) of the semiconductive elastic layer is determined as follows: putting a semiconductive roller on a metallic plate or another material, applying a load of 500 g to each end of the semiconductive roller, applying a voltage (V) of 1.0 kV to the semiconductive roller, reading a current value I (A) after 10 seconds have passed, and putting each value into the following formula for calculation.

$R=V/I$

The thickness of the semiconductive elastic layer may be adjusted on the basis of the intended use of the semiconductive roller and is generally adjusted to be in the range of 2 to 12 mm.

The semiconductive elastic layer may have any layer structure provided that surface properties, electrical properties, or other properties are adjusted on the basis of the intended use of the semiconductive roller and may have a monolayer or multilayer structure.

Method for Manufacturing Semiconductive Roller

The method for manufacturing the semiconductive roller of the present exemplary embodiment includes at least a process of kneading a rubber composition containing at least an epichlorohydrin rubber and a conducting agent, a process of forming the kneaded rubber composition into a substantially roll shape, a process of heating the rubber composition for vulcanization and foaming to form a semiconductive elastic product having a substantially roll shape, a process of polishing a circumferential surface of the semiconductive elastic product having a substantially roll shape, and a process of cleaning the semiconductive elastic product having the polished circumferential surface.

Kneading Process

The rubber composition containing an epichlorohydrin rubber and a conducting agent is kneaded with, for instance, a tumbler, a V-shaped blender, a nauta mixer, a Banbury mixer, or a kneading roller. Each component may be mixed in any order; for example, a composition containing two or more components is kneaded, and then the other components may be mixed therewith and kneaded.

Forming Process

After the kneading process, the rubber composition is extruded into a roll shape (cylindrical shape) with an extruder, thereby being formed into a roll (rubber composition in the form of a roll) containing an unvulcanized rubber composition.

Heating Process

After the forming process, the unvulcanized roll is heated for vulcanization and foaming to produce a semiconductive elastic product having a roll shape. The unvulcanized roll (rubber composition in the form of a roll) is, for example, heated at 160° C. for 20 minutes for vulcanization and foaming.

Polishing Process

After the heating process, the circumferential surface of the roll which has undergone vulcanization and foaming (semiconductive elastic product having a roll shape) is polished.

Cleaning Process

After the polishing process, the roll which has had its circumferential surface polished is cleaned.

In the cleaning process, for example, the roll which has had its circumferential surface polished is entirely immersed into pure water for not less than 30 minutes or approximately not less than 30 minutes. The roll is cleaned so as to satisfy the following requirement: in the case where the roll is removed from the pure water, dried, and then left to stand in different pure water (20° C.) for 30 minutes, the chlorine ion content derived from the semiconductive elastic product per unit area is not more than 0.06 μmol/cm$^2$ or approximately not more than 0.06 μmol/cm$^2$.

In the cleaning process, although ultrasonic waves may be used to promote cleaning, the cleaning process involving use of ultrasonic waves may remove part of the conducting agent or another material from the roll, which may result in a deviation from the intended conductivity. Cleaning may be performed by leaving the roll to stand in pure water or stirring pure water to such an extent that the conducting agent is not removed from the surface of the roll.

Through these processes, the semiconductive roller of the present exemplary embodiment is manufactured.

The semiconductive roller of the present exemplary embodiment may be used in any application, such as transfer rollers and charging rollers used in image forming apparatuses. The semiconductive roller of the present exemplary embodiment is suitably used as transfer rollers and, in particular, appropriately employed as a first transfer roller used for transferring a toner image formed on an image carrier to an intermediate transfer belt.

An image forming apparatus will now be described, in which the semiconductive roller of the present exemplary embodiment is used as a transfer roller.

Image Forming Apparatus

The image forming apparatus of the present exemplary embodiment includes an image carrier, a charging unit used for charging a surface of the image carrier, an electrostatic latent image forming unit used for forming an electrostatic latent image on the charged surface of the image carrier, a developing unit used for developing the electrostatic latent image on the surface of the image carrier with toner to form a toner image, and a transfer unit including the semiconductive roller of the above-mentioned exemplary embodiment and used for transferring the toner image formed on the surface of the image carrier to a transfer medium.

The image forming apparatus of the present exemplary embodiment will now be described with reference to the drawing. FIG. 1 schematically illustrates an example of the image forming apparatus of the present exemplary embodiment.

The image forming apparatus illustrated in FIG. 1 includes first to fourth electrophotographic image forming units 10Y, 10M, 10C and 10K (image forming portions) which output yellow (Y), magenta (M), cyan (C) and black (K) color images, respectively, on the basis of image data separately corresponding to these colors. These image forming units 10Y, 10M, 10C and 10K are horizontally disposed in parallel so as to be spaced apart from each other at predetermined intervals. Each of the image forming units 10Y, 10M, 10C and 10K may be a process cartridge which is detachably provided to the body of the image forming apparatus.

Each of the first to fourth image forming units 10Y, 10M, 10C, and 10K has the same configuration. The first unit 10Y which is disposed on the upstream side in a rotational direction of an intermediate transfer belt to form yellow images is herein described as a representative example of the image forming units. The components of the second to fourth image forming units 10M, 10C and 10K which are equivalent to those of the first image forming unit 10Y are denoted by reference symbols including the characters M for magenta, C for cyan, and K for black, respectively, as in the components of the first image forming unit 10Y denoted by reference symbols including the character Y for yellow, thereby omitting description of the second to fourth image forming units 10M, 10C and 10K.

The first image forming unit 100Y includes a photoconductor 1Y that serves as an image carrier. The first image forming unit 10Y has the following constituents provided around the photoconductor 1Y in this order: a charging roller 2Y which charges the surface of the photoconductor 1Y to a predetermined electric potential, an exposure region in which the charged surface is exposed to a laser beam 3Y emitted from an exposing device 3 on the basis of image data separately corresponding to different colors to form an electrostatic image, a developing device (developing unit) 4Y which supplies charged toner to the electrostatic image to develop the electrostatic image, a first transfer roller 5Y (part of transferring unit) which transfers the developed toner image onto an intermediate transfer belt 20, and a photoconductor cleaning device (cleaning unit) 6Y which removes the toner remaining on a surface of the photoconductor 1Y with a cleaning blade after the first transfer.

Toners of four colors including yellow, magenta, cyan, and black which are stored in toner cartridges 8Y, 8M, 8C, and 8K may be supplied to the developing devices (developing units) 4Y, 4M, 4C, and 4K of the image forming units 10Y, 10M, 10C, and 10K, respectively.

The semiconductive roller of the above-mentioned exemplary embodiment is employed in each of the first transfer rollers 5Y, 5M, 5C, and 5K. The first transfer roller 5Y is disposed at the inside of the intermediate transfer belt 20 so as to face the photoconductor 1Y. The first transfer rollers 5Y, 5M, 5C, and 5K are individually connected to bias supplies (not illustrated) used for applying a first transfer bias. Each bias supply is controlled by a controller (not illustrated) to change the transfer bias to be applied to the corresponding first transfer roller.

The intermediate transfer belt 20 is disposed on the upper side of each of the image forming units 10Y, 10M, 10C, and 10K in FIG. 1 and runs through each image forming unit for first transfer of each toner image. The intermediate transfer belt 20 is wound around a driving roller 22 and a support roller 24 under tension and runs in a direction from the first image forming unit 10Y toward the fourth image forming unit 10K, the driving roller 22 and the support roller 24 being spaced apart from each other, the support roller 24 contacting the inner surface of the intermediate transfer belt 20.

A second transfer roller 26 (part of the transfer unit) is disposed near the intermediate transfer belt 20 so as to face the support roller 24 with the intermediate transfer belt 20 interposed therebetween. An intermediate transfer body-cleaning device 30 is disposed on the downstream side from the second transfer roller 26 in the rotational direction of the intermediate transfer belt 20 so as to face the driving roller 22 with the intermediate transfer belt 20 interposed therebetween. The semiconductive roller of the above-mentioned exemplary embodiment may be also used in the second transfer roller 26.

A fixing device 28 is disposed on the downstream side from the second transfer roller 26 to fix toner images onto recording paper P (recording medium).

Processes for forming yellow images with the first image forming unit 10Y will now be described. In advance of such processes, the surface of the photoconductor 1Y is charged to, for example, an electric potential of approximately −600 to −800 V with the charging roller 2Y.

In the photoconductor 1Y, a photosensitive layer is formed on a conductive substrate (volume resistivity at 20° C.: not more than $1 \times 10^6$ Ωcm). The photosensitive layer normally exhibits high resistance (resistance equivalent to those of general resins); in the case where the photosensitive layer is irradiated with the laser beam 3Y, the specific resistance of the region irradiated with the laser beam is changed.

The laser beam 3Y is emitted from the exposing device 3 to the charged surface of the photoconductor 1Y on the basis of image data for yellow which has been transmitted from a controller (not illustrated). The laser beam 3Y is radiated to the photosensitive layer being the surface of the photoconductor 1Y, so that an electrostatic image of a yellow printing pattern is formed on the surface of the photoconductor 1Y.

The electrostatic image herein refers to an image formed on the surface of the photoconductor 1Y owing to charging and is a so-called negative latent image formed as follows: part of the photosensitive layer is irradiated with the laser beam 3Y to decrease the specific resistance thereof, and this causes a release of electric charges on the charged surface of the photoconductor 1Y whereas electric charges remain in another part not irradiated with the laser beam 3Y.

The electrostatic image formed on the surface of the photoconductor 1Y is carried to a predetermined developing position corresponding to the developing device 4Y by the rotation of the photoconductor 1Y. The electrostatic image on the photoconductor 1Y is developed to a visible image (developed image) as a toner image at this developing position by the developing device 4Y.

The developing device 4Y contains a yellow toner. The yellow toner is stirred in the developing device 4Y for frictional charging, has electric charges exhibiting the same polarity (negative polarity) as the electric charges on the charged photoconductor 1Y, and is held on a developer roller (developer holding component). The surface of the photoconductor 1Y passes through the developing device 4Y, so that the yellow toner electrostatically adheres to a latent image portion at which electric charges have been released from the surface of the photoconductor 1Y to form the electrostatic image; thus, the latent image is developed with the yellow toner. The photoconductor 1Y on which the yellow toner image has been formed continues to be rotated at a predetermined speed, and the toner image formed on the photoconductor 1Y is conveyed to a predetermined first transfer position.

When the yellow toner image on the photoconductor 1Y is conveyed to the first transfer position, a predetermined first transfer bias is applied to the first transfer roller 5Y, and an electrostatic force directed from the photoconductor 1Y toward the first transfer roller 5Y acts on the toner image, so that the toner image on the photoconductor 1Y is transferred onto the intermediate transfer belt 20. In this case, the transfer bias to be applied has a polarity (positive) opposite to that of the toner (negative polarity). For instance, the bias is controlled to approximately +10 μA by a controller (not illustrated) in the first image forming unit 10Y.

Meanwhile, the toner remaining on the photoconductor 1Y is removed by the photoconductor cleaning device 6Y and then recovered.

First transfer biases to be applied to the first transfer rollers 5M of the second image forming unit 10M and the other first transfer rollers 5C and 5K are controlled as in the first image forming unit 10Y.

In this manner, the intermediate transfer belt 20 onto which the yellow toner image has been transferred by the first image forming unit 10Y successively passes through the second to fourth image forming units 10M, 10C and 10K, and toner images of respective colors are superposed and multi-transferred.

The four-color toner images which have been multi-transferred onto the intermediate transfer belt 20 through the first to fourth image forming units are conveyed to a second transfer portion constituted by the intermediate transfer belt 20, the support roller 24 contacting the inner surface of the intermediate transfer belt 20, and the second transfer roller 26 (second transfer unit) disposed on the side of the image holding surface of the intermediate transfer belt 20. A recording medium P is fed with a feeding mechanism at a predetermined timing to a gap at which the second transfer roller 26 is brought into contact with the intermediate transfer belt 20 with application of pressure, and a predetermined second transfer bias is applied to the support roller 24. In this case, the transfer bias to be applied has a polarity (negative) the same as that of the toner (negative polarity), and an electrostatic force directed from the intermediate transfer belt 20 toward the recording medium P acts on the toner image, so that the toner image on the intermediate transfer belt 20 is transferred onto the recording medium P. In this case, the second transfer bias is determined on the basis of a resistance detected by a resistance detector (not illustrated) used for detecting a resistance of the second transfer portion, and its voltage is controlled.

Then, the recording medium P is transported to the fixing device (fixing unit) 28, and the multicolor toner images are heated to be melted, thereby fixing the toner images onto the recording medium P. The recording medium P onto which a color image has been successfully fixed is transported to a discharge portion, and then a series of processes for forming a color image is completed.

In the exemplified image forming apparatus, a toner image is transferred to the recording medium P via the intermediate transfer belt 20; however, the image forming apparatus of the present exemplary embodiment may have a configuration in which a toner image is directly transferred from an image carrier to the recording medium P. In this case, for example, the semiconductive roller of the above-mentioned exemplary embodiment may be used as a transfer roller which is disposed so as to face an image carrier at a position at which a toner image on the image carrier is to be transferred to a recording medium, the transfer roller serving to transfer the toner image on the image carrier onto the recording medium.

EXAMPLES

Examples will be hereinafter described. In the following description, the terms "part" and "%" each refer to an amount on a mass basis unless otherwise specified.

Example 1

Manufacturing of Semiconductive Roller
Binary copolymer of epichlorohydrin and allyl glycidyl ether (ECO)
Zechlone 1100 manufactured by Zeon Corporation: 40 parts by mass
Acrylonitrile-butadiene Rubber (NBR)
Nipol DN223 manufactured by Zeon Corporation: 60 parts by mass
Carbon Black
Particulate acetylene black manufactured by DENKI KAGAKU KOGYO KABUSHIKI KAISHA: 10 parts by mass
Asahi Thermal FT manufactured by Asahi Carbon Co., Ltd.: 50 parts by mass
Foaming Agent
Benzenesulfonyl hydrazide: 6 parts by mass Vulcanizing Agent
Sulfur 200 mesh manufactured by Tsurumi Chemical Co., Ltd.: 1 part by mass
Vulcanizing Accelerator
NOCCELER M manufactured by OUCHI SHINKO CHEMICAL INDUSTRIAL CO., LTD.: 1.5 parts by mass
The rubber composition containing the components listed above is kneaded with an open roll mill.

The kneaded rubber composition is extruded into a shape having a hole at the center thereof (doughnut-like shape), thereby being formed into a cylindrical roll.

Then, the cylindrical roll is heated at 160° C. for 20 minutes for vulcanization and foaming.

A shaft made from SUS and having a diameter of 8 mm is inserted into the hole at the center of the roll after the vulcanization and foaming, and then the circumferential surface of the roll is polished to yield a semiconductive roll having an outer diameter of 28 mm (rubber thickness: 10 mm) and a length of 332 mm.

The polished roll is immersed into pure water (20° C.) for 30 minutes. The roll is removed from the pure water and then air-dried, thereby completing manufacturing of a semiconductive roller.

Comparative Example 1

A semiconductive roller is manufactured as in Example 1 except that a roll is not immersed into pure water after the polishing of the circumferential surface of the roll in the processes for manufacturing the semiconductive roller of Example 1.

Evaluation of Decrease in Resistance

Electricity is allowed to run through each of the semiconductive rollers manufactured as described above at low temperature and humidity (10° C. and 15% RH) under the conditions described below, and then the volume resistance of the semiconductive roller was measured at high temperature and humidity (28° C. and 85% RH) and 1000 V.

Electricity is allowed to run as follows: the circumferential surface of the semiconductive roller manufactured as described above is brought into contact with an intermediate transfer roller in which an intermediate transfer belt has been wound around the circumferential surface of an aluminum cylinder, a load (1 kg) is applied in this state, and voltage is continuously applied for a predetermined time period so as to provide a constant current of 105 μA while the semiconductive roller is rotated at 800 mm/sec.

In measurement of volume resistance value (R) after the running of electricity, the semiconductive roller is put on a metallic plate, a load of 500 g is applied to each end of the semiconductive roller, a voltage (V) of 1.0 kV is applied to the semiconductive roller, electric current I (A) is read 10 seconds later with a Digital Ultra-High Resistance/Micro Current Meter (8340A) manufactured by ADC Corporation, and a volume resistance value is obtained from the following formula.

$$R=V/I$$

Figure 2:
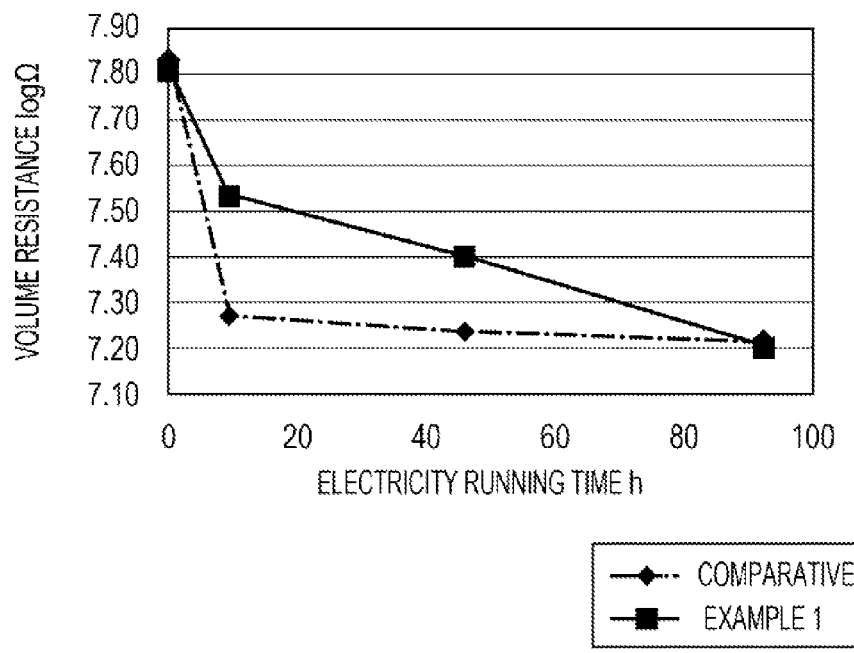
FIG. 2 illustrates changes in volume resistance with time over which electricity has run through a semiconductive roller.

FIG. 2 illustrates the relationships between time over which electricity has run at low temperature and humidity and volume resistance subsequently measured at high temperature and humidity. Each semiconductive roller exhibits a decrease in volume resistance at high temperature and humidity as time over which electricity has run at low temperature and humidity advances; however, volume resistance greatly decreases at the initial stage of the running of electricity in the semiconductive roller of Comparative Example 1 whereas volume resistance gradually decreases in the semiconductive roller of Example 1.

Evaluation of Cl Ion Content and Decrease in Volume Resistance

Measurement of Ion Content

Figure 3:
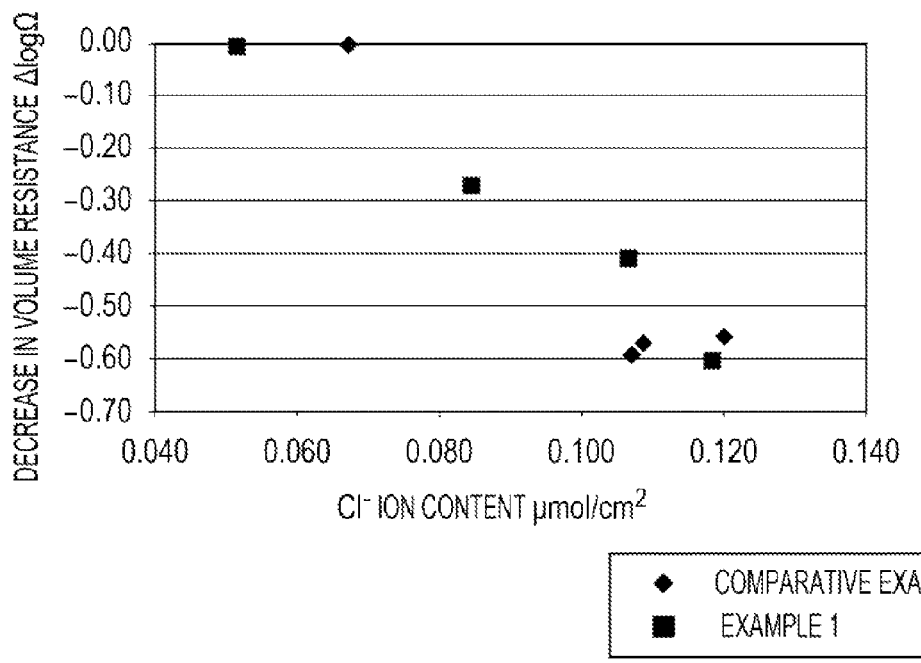
FIG. 3 illustrates relationships between the Cl ion contents derived from semiconductive rollers and decreases in volume resistance.

Part of the semiconductive roller in a length of 10.1 cm from one end thereof in the axial direction is immersed into 1.2 L of pure water, left to stand for 30 minutes, and then removed from the pure water. Then, a predetermined amount of this pure water is collected and diluted 50 times. The Cl ion content in the pure water is then measured with a DX-320J Ion Chromatograph manufactured by Dionex Corporation and subsequently converted into Cl ion content per unit area of the semiconductive elastic layer of the immersed semiconductive roller ($\mu$mol/cm$^2$). Table 1 and FIG. 3 depict the relationships between the Cl ion content and a decrease in volume resistance. The number of printed media has a correlation with the time over which electricity has run through the semiconductive roller.

TABLE 1

| Number of printed media (≈electricity running time/h) | Example 1 | | Comparative Example 1 | |
|---|---|---|---|---|
| | Cl ion content ($\mu$mol/cm$^2$) | Decrease in resistance (log$\Omega \cdot$cm) | Cl ion content ($\mu$mol/cm$^2$) | Decrease in resistance (log$\Omega \cdot$cm) |
| 0 (0) | 0.051 | 0 | 0.067 | 0 |
| 100,000 (9.3) | 0.084 | −0.27 | 0.120 | −0.55 |
| 500,000 (46.3) | 0.106 | −0.40 | 0.107 | −0.59 |
| 1,000,000 (92.5) | 0.118 | −0.60 | 0.108 | −0.56 |

In Table 1, values of 0.55 to 0.59 are within a tolerance range of measurement error and may be viewed as the same value.

As is clear from Table 1 and FIG. 3, resistance greatly decreases with an increase in the Cl ion content; in other words, an increase in the Cl content has correlation with a decrease in resistance. Each of the semiconductive rollers of Example 1 and Comparative Example 1 has a tendency in which an increase in the number of printed media accompanies an increase in the Cl ion content and a decrease in resistance. After printing of 100×1000 media, however, resistance greatly decreases in the semiconductive roller of Comparative Example 1 whereas gradually decreasing in the semiconductive roller of Example 1 in which the initial Cl ion content has been adjusted to 0.06 $\mu$mol/cm$^2$ or lower; in particular, the decrease in resistance in Example 1 is approximately half the decrease in resistance in Comparative Example 1. The cleaning process involving use of pure water has been carried out at the final stage of the manufacturing of the semiconductive roller to decrease the initial Cl content from 0.067 $\mu$mol/cm$^2$ to 0.051 $\mu$mol/cm$^2$, which gives an effect in which the subsequent decrease in resistance is suppressed.

Evaluation of Image

The semiconductive roller of Example 1 is used as the second transfer roller of "Color 1000 Press" (modified) manufactured by Fuji Xerox Co., Ltd. Printing is carried out at low temperature and humidity in the numbers of recording media of 0, 100, 500,000, and 1,000,000, and then images are recorded at high temperature and humidity. Images having good quality are produced with the semiconductive roller of Example 1; in contrast, image defects are caused with the semiconductive roller of Comparative Example 1 in some cases.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A semiconductive roller comprising:
  a conductive support; and
  a semiconductive elastic layer disposed on a circumferential surface of the conductive support, the semiconductive elastic layer containing at least an epichlorohydrin rubber, an acrylonitrile-butadiene rubber, and a conducting agent and having a foam structure, wherein a mixing ratio of the epichlorohydrin rubber to the acrylonitrile-butadiene rubber ranges from 80/20 to 20/80 by mass,
  wherein, when the semiconductive roller is immersed in pure water for 30 minutes, a chlorine ion content derived from the semiconductive elastic layer per unit area of the semiconductive elastic layer is approximately not more than 0.06 $\mu$mol/cm$^2$,
  wherein no electricity has been run through the semiconductive roller before the semiconductive roller is immersed in the pure water for 30 minutes, and
  wherein a volume resistivity of the semiconductive roller ranges from greater than 7 log$\Omega$·cm to 13 log$\Omega$·cm at 20° C.,
  the semiconductive roller being manufactured by a process comprising a cleaning process that comprises immersing the semiconductive elastic layer into pure water for approximately not less than 30 minutes for cleaning.

2. The semiconductor roller according to claim 1, wherein the semiconductive roller is a transfer roller used in an image forming apparatus.

3. An image forming apparatus comprising:
  an image carrier;
  a charging unit that charges a surface of the image carrier;
  an electrostatic latent image forming unit that forms an electrostatic latent image on the charged surface of the image carrier;

a developing unit that develops the electrostatic latent image on the surface of the image carrier with toner to form a toner image; and a transfer unit including the semiconductive roller according to claim 1, the transfer unit transferring the toner image formed on the surface of the image carrier to a transfer medium.

4. A method for manufacturing the semiconductive roller according to claim 1, the method comprising:

kneading a rubber composition containing at least an epichlorohydrin rubber, an acrylonitrile-butadiene rubber, and a conducting agent;

forming the kneaded rubber composition into a substantially roll shape;

heating the rubber composition for vulcanization and foaming to form a semiconductive elastic product having a substantially roll shape;

polishing a circumferential surface of the semiconductive elastic product having a substantially roll shape; and cleaning the semiconductive elastic product having the polished circumferential surface, wherein the semiconductive elastic layer is placed on an outer circumferential surface of the conductive support to form the semiconductive roller, wherein the semiconductive elastic product having the polished circumferential surface is immersed into pure water for approximately not less than 30 minutes for the cleaning.

5. The semiconductive roller according to claim 1, wherein a surface hardness of the semiconductive roller, determined as Asker-C hardness in accordance with JIS K-7312, is in a range of 10° to 70°.

6. The semiconductive roller according to claim 1, wherein a thickness of the semiconductive elastic layer is in a range of 2 to 12 mm.

* * * * *